United States Patent [19]

Belgiorno

[11] Patent Number: 5,040,330

[45] Date of Patent: Aug. 20, 1991

[54] ROOT SEPARATING MEANS FOR PLANT CONTAINER

[76] Inventor: Carlo Belgiorno, 1165 Connetquot Ave., Central Islip, N.Y. 11722

[21] Appl. No.: 535,511

[22] Filed: Jun. 11, 1990

[51] Int. Cl.$^5$ ............................................. A01G 23/02
[52] U.S. Cl. ............................................ 47/73; 47/69
[58] Field of Search ................................. 47/66, 73, 79

[56] References Cited

U.S. PATENT DOCUMENTS

| | | | |
|---|---|---|---|
| 3,552,058 | 1/1971 | Fici | 47/79 |
| 3,830,015 | 8/1974 | Belgiorno | 47/73 |
| 4,296,569 | 10/1981 | Edwards | 47/73 |
| 4,593,490 | 1/1986 | Bodine | 47/79 |

FOREIGN PATENT DOCUMENTS 659846  10/1951  United Kingdom .................... 47/79

*Primary Examiner*—Henry E. Raduazo
*Attorney, Agent, or Firm*—Edward H. Loveman

[57] ABSTRACT

A root separator structure adapted for disposition in a container having peripheral walls to facilitate insertion of the root system of a plant into and removal from the container, to hold the plant stably in the container, and to enhance root growth in the container. The structure has a shell-like body with coplanar radial arms defining compartments in the container. The radial arms terminate in steps elevated above the plane of the arms, to contact and hold the root system of the plant in upright position. The steps have inclined faces which help guide the root system into and out of the container. The steps can be integrally joined to the peripheral walls, or the body can be separate to the removed from the container with the plant to facilitate spreading the divided root clumps.

9 Claims, 2 Drawing Sheets

ROOT SEPARATING MEANS FOR PLANT CONTAINER

BACKGROUND OF THE INVENTION

1. Field of the Invention

This invention relates to the art of plant containers, and more particularly it concerns an improved means in a plant container for dividing the roots of a plant into clumps or clusters while growing in the container.

2. Description of the Prior Art

In my prior U.S. Pat. No. 3,830,015 entitled "ROOT SEPARATING MEANS FOR PLANT CONTAINER", I have disclosed a device for promoting plant growth by means of a root separator adapted for disposition as an insert inside a plant container having a peripheral wall. Alternatively the root separator can be molded in place in the container at the time of manufacture. The root separator has outwardly extending apertured walls terminating at the peripheral wall of the container and defining therewith a plurality of compartments into which the root system of the plant can grow to form a plurality of root clusters. The root clusters can be spread apart radially after the plant is removed from the container for transplanting.

This device has proven generally successful in practice, but several difficulties have been encountered in its usage. In the first place, it is often required to transplant into a plant container a plant which has grown elsewhere and has developed a large, compact root ball or a plant which has been grown in a deep liner pot. It is very difficult to fit such a ball into a tapered plant container, because the ball rolls around and is not stable. If the ball is forced into a tapered pot which can hold the root ball snugly, the space is insufficient for proper root growth and the roots will grow into a tight tangled mass and when planted outdoors will have what is commonly known as an interface problem. The roots also cannot be watered, nourished and aerated properly. The transplant pot must necessarily be larger than the root ball. Bare root plants cannot be placed in the pot quickly and assume a stable position. When hundreds or thousands of plants are to be transplanted as is common in the plant nursery industry, the transplanting operations becomes very time consuming, laborious and inefficient.

SUMMARY OF THE INVENTION

The present invention is directed at overcoming the abovementioned and other difficulties encountered with the prior root separators. In the root separators described in my prior patent abovementioned, the root separators is generally Y-shaped or cross-shaped in plan view. The root separator has apertured flaring walls which have an inverted V-shape in cross section. The ridges or apices of the V-shaped walls are all disposed in a horizontal plane in the pot. I have discovered that it is possible to achieve all the advantages of the present invention by adding a step formation at the radially outward end of each inverted V-shaped wall of the root separator.

The step formation produces several very desirable results. Each step has a slanted riser which serves to guide the root ball directly over the inverted V-shap wall with the shoulders or tops of the step holding the root ball in place. This makes it possible to insert hundreds of root balls of growing plants directly into plant containers in a very rapid and efficient manner. The balls are held in place stably and do not turn around on a vertical axis nor do they tip over or move laterally, since an ample cylindrical space is provided around the root ball which can be filled with enriched potting material and into which the growing roots can expand as they grow. Watering becomes easier and quicker and the roots have immediate access to the water and fertilizer. The addition of the separator steps make it possible to dispose the separator lower in the container then has been customary to heights ranging from 5% to 30% of the height of the container, so that a tapered pot can accomodate a larger root ball and the root ball will have more room to grow in the pot. As the roots grow they overlay the separator steps which holds the plant more stably in the plant container. The apertured walls of the root separators together with the cylindrical space around the root ball facilitate aeration, drainage and feeding of the plant. The roots developed in a plant container having the present invention, spread out readily into clumps, when removed from the container, so that they can be transplanted easily into a larger container or into the ground where they will take hold more quickly, since the root clumps will be pulled outward and placed in the vertical movement of water. The aerated inverted V separator with a radial step, creates an environment for root growth and at the time of planting out it gives the plant more transplantability which will serve as a useful adjunct in the fields of horticulture, agriculture, forestry, and general plant husbandry.

It is therefore a principal object of the invention to provide a root separator or divider for a plant container, with radial arms having steps to facilitate insertion of a root ball into the container and removal from the container.

A further object is to provide a root separator in a container with a step to space a root ball radially from the peripheral wall of the container, to provide root growing space all around the root ball and below ther step.

Another object is to provide a root separator with radially extending arms having inverted V-shaped apertured walls terminating in raised tapered steps.

Another object is to provide a root separator having the characteristics described which can be constructed as a separate insert for a plant container or as an integral molded unit in the container.

Still another object is to provide a stepped root separator as described adapted for use in plant containers or pots as small as a one half of an inch in diameter or as large as forty or more inches in diameter.

These and other objects and many of the attendant advantages of this invention will be readily appreciated as the same becomes better understood by reference to the following detailed description when considered in connection with the accompanying drawings in which:

BRIEF DESCRIPTION OF THE DRAWINGS

FIG. 13 is a bottom plan view of the stepped root separator of FIG. 13.

DESCRIPTION OF THE PREFERRED EMBODIMENTS

Figure 1:
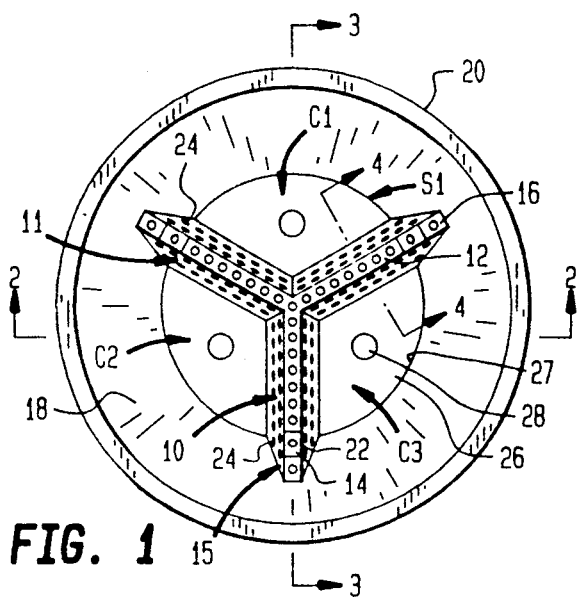
FIG. 1 is a top plan view of a plant container having a stepped Y-shaped root separator integral with the container wall.
Figure 4:
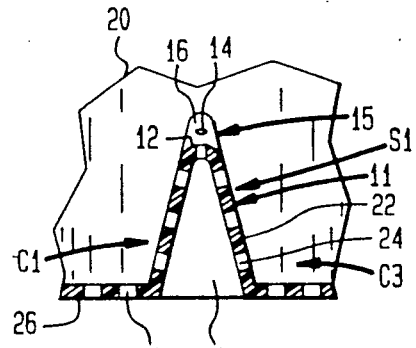
FIG. 4 is an enlarged fragmentary sectional view taken along line 4—4 of FIG. 1.
Figure 2:
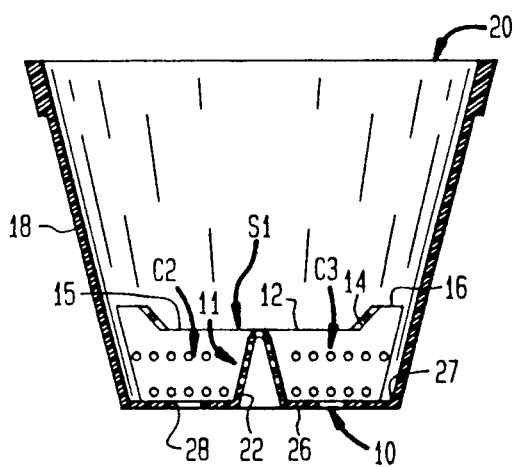
FIG. 2 and FIG. 3 are cross sectional views taken along lines 2—2 and 3—3 respectively of FIG. 1.

Referring now to the drawings wherein like reference characters designate like or corresponding parts throughout, there is illustrated in FIGS. 1-4, a first stepped root separator S1 having hollow shell-like body generally designated by reference numeral 10 which is generally Y-shaped in plan view. Each arm 11 of the body 10 has a narrow top wall or ridge 12 extending radially outward in a horizontal plane from a common center point. Each of the ridges 12 terminates at an outwardly flaring or slanted flat riser 14 of a step 15 having an inverted V shaped horizontal top or platform 16. All the platforms 16 are disposed in a horizontal coplanar disposition. The ridges 12 and the steps 15 each have a plurality of holes through which water drains and air is exchanged. The steps 15 are integral with the flaring walls or sides 18 of a conical plant container or planting pot 20. Integral with 20 each of the flat top ridges 12 is a flaring side 22 of the arm 11. In cross section the arms 11 have an inverted V-shape. The sides 22 and the ridges 12 are formed with holes 24 through which the water and air may pass readily to feed and aerate the plant to be mounted in the plant container on the body 10. The inclined inclined sides 22 are integral with an annular flat bottom plate 26. The periphery 27 of the plate 26 is integral with the inside of the conical side 18 of the container 20. A plurality of holes 28 in the bottom plate 26 admit air and pass drainage water out of the container 20.

In use a plant having a root ball can be set into the container 20 quickly and easily. The root ball will be guided down to the arms 11 of the body 10 by the slanted risers 14 and the steps 15 will hold the root ball in place. This will enable enable the roots of the plant to grow freely down into the three compartments C1, C2 and C3 defined by the inverted V-shaped arms 11 and the container wall 18. The bottom of the container 20 will of course be filled with potting soil to a level above the bottom of the step 15. When the roots are sufficiently grown, the plant can easily be lifted out of the container. The roots will grow over the tops 16 of the steps 15, which help to keep keep the plant in a stable position in the container. After the plant is removed the roots will be found divided into three root clumps as they are withdrawn from chambers C1, C2 and C3. The presence of steps 15 increases the efficiency of transplanting plants into and out of containers 20 to economize in time and labor. In addition the plants grow better because they have more space to grow and enjoy healthier, more vigorous root growth.

Figure 5:
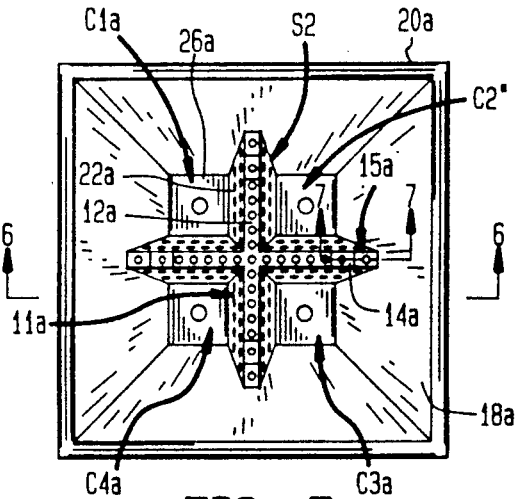
FIG. 5 is a top plan view of a plant container having a stepped cross-shaped root separator integral with side walls of the container.
Figures 3, 7:
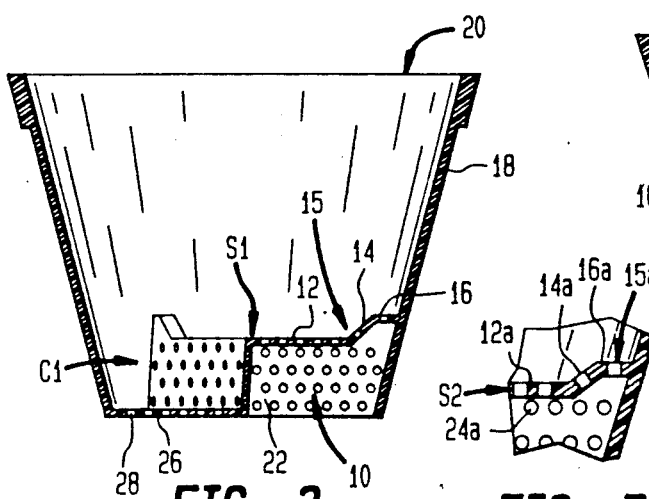
FIG. 7 is an enlarged fragmentary sectional view taken along line 7—7 of FIG. 5.
Figure 6:
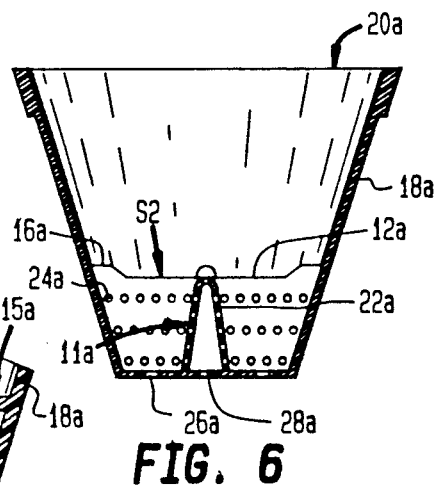
FIG. 6 is a cross sectional view taken along line 6—6 of FIG. 5.
Figure 8:
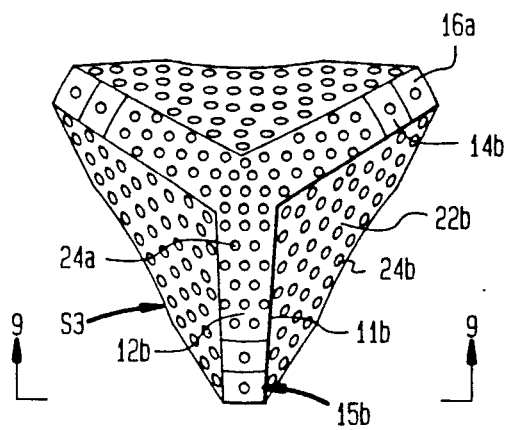
FIG. 8 is a top plan view of a stepped Y-shaped root separator body adapted for insertion into a plant container.
Figure 10:
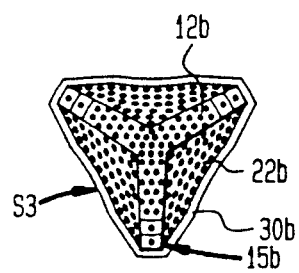
FIG. 10 is a further reduced bottom plan view of the stepped root separator of FIGS. 8 and 9.
Figure 11:
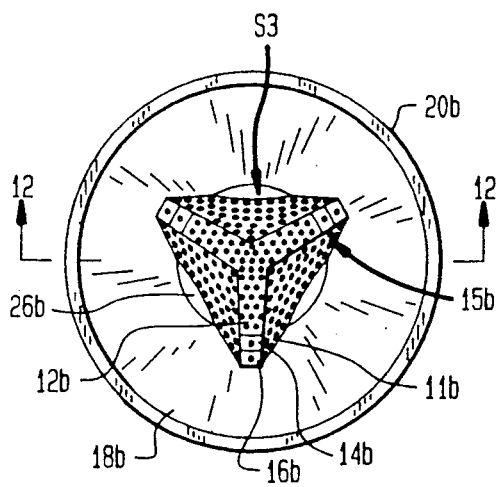
FIG. 11 is a top plan view of the stepped Y-shaped root separator of FIG. 8 on a reduced scale shown inserted into a plant container.
Figure 12:
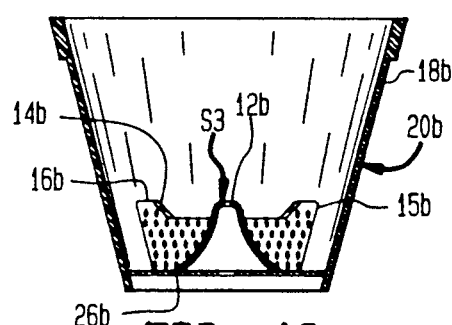
FIG. 12 is a vertical cross sectional view taken along line 12—12 of FIG. 11.
Figure 9:
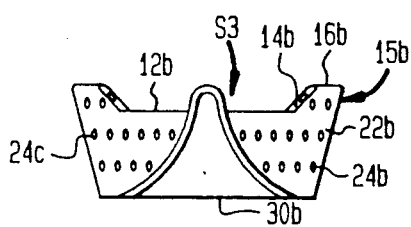
FIG. 9 is a reduced side elevational view taken along line 9—9 of FIG. 8.
Figure 13:
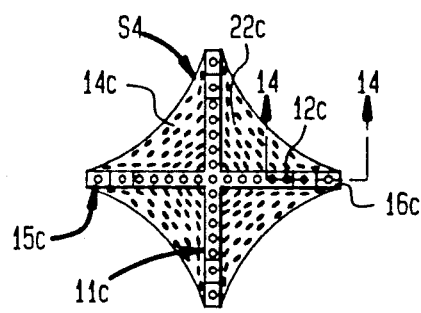
FIG. 13 is a top plan view of a stepped, cross-shaped root separator insert for a plant container.
Figure 15:
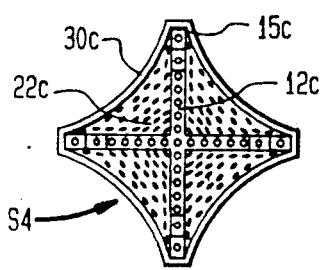
Figure 14:
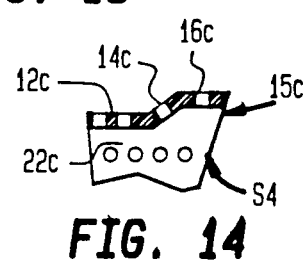
FIG. 14 is an enlarged fragmentary vertical sectional view taken along line 14—14 of FIG. 13.

In FIGS. 5-7 is shown another root separator S2 build in a pyramidal plant container 20a. The root separator has four arms 11a disposed at right angles to each other in a cross-shaped array. Straight coplanar ridges 12a extend radially outward from a common center and terminate at steps 15a which are integral with side walls 18a of the container 20a. Each of the steps has an inclined face or riser 14a facing inwardly of the container 20a. Platforms 16a are coplanar and elevated above the plane of ridges 12a. Lateral slanted sides 22a of the inverted V-shaped arms 11a define four compartments C1a-C4a into which the roots of the plant can grow separated by the arms 11a of the separator S2. The sides 22a are integral with the flat bottom 26a of the container. Holes 24a in the sides 22a and the ridges 12a allow circulation of air and drainage of water through the plant root system when a plant is installed on the separator S2. This separator S2 like the separator S1 serves to stabilize the position of the plant while facilitating root growth in four clumps or bunches which are easy to spread out radially when the plant is removed from the container 20a. The maximum height of the separators S1 and S2 is a small fraction of the total height of the container. It may range from 5% to 30% of the total axial height of the container interior. The height of the steps 15 and 15a may be about 5% to 15% of the height of the ridges 12 or 12a above the container bottom. The radial widths of the steps 15, 15a may range from one-sixteen to six inches depending on the diameter of the container, and the heights of the steps may range from one-half inch in a smaller container to 4 inches in a large container.

FIGS. 8-12 show a third separator S3 which is basically the same as separator S1, except that it is a separate insert intended for installation in a round, conical plant container 20b. Separator S3 is a shell-like structure with three radial arms 11b terminating at an integral with three elevated steps 15b. Each step has an inclined face or riser 14b and a flat top platform or shoulder 16a. Sides 22b of the separator are rather concave and extend downward from the integral top ridges 12b. Holes 24b in the ridges and sides allow circulation of air and drainage of water. The separators S3 can be placed in the container 20c with flat free rim 30b resting on the bottom 26b of the container, where the separator will receive and support a root ball radially within steps 15b on ridges 12a. The steps may abut side wall 18b and will support the root ball at its outer sides to prevent lateral shifting, twisting and turning, and will hold the plant in an upright position. The separator S3 serves as a unit which can be removed from the container with the plant and then detached from the root system. The separator can be made of any desired material such a plastic, metal, glass, ceramic, etc., while the container can be of different material such as clay, wood, etc.

The separator S4 shown in FIGS. 13-16 is intended as an insert for a plant container which is round or rectangular in horizontal cross section. Separator S4 is similar to separator S2 of FIGS. 5-7 with four arms 11c.

Each of the arms 11c terminates in an outer step 15c whose should 16c is elevated above the plane of cross ridges 12c of the shell-like separator S4. When this separator is in a plant container it will define four compartments or chambers to allow roots to grow in separate clumps or bunches. The slanted, curved sides 22c of the separator are integral with ridges 12c and have holes 24c and a bottom flat free rim 30c which will rest on the bottom of the container. As in the other separators, the slanted faces 14c of the steps serve to guide the root ball into the separator and help to hold it in place.

The separators S3 and S4 can be manufactured by mass production machinery at low cost for installation in conventional flower pots and other plant containers.

It has been found that the presence of the steps 15, 15a-15c on the separators S1-S4 enhances root growth and plant nutrition so that the roots grow faster, longer and stronger than with the prior separators described in the patent above mentioned. As a result the present invention produces healthier, more vigorous plants.

It should be understood that the foregoing relates to only a limited number of preferred embodiments of the invention which have been by way of example only, and that is intended to cover all changes and modifications of the examples of the invention herein chosed for the purposes of the disclosure, which do not constitute departures from the spirit and scope of the invention.

What is claimed is:

1. A root separator structure for growing a plant having a root system in container having peripheral walls, and adapted to facilitate insertion of the plant into and removal from the container for transplantation purposes; comprising:

a shell-like body having radial arms formed with coplanar top ridges and apertured slanted sides integral with said ridges and defining a plurality of separate compartments in said container, each of said arms terminating at a step integral with each of said ridges and elevated above, said ridges for holding said root system stationary with said plant in upright position when inserted in said container and set on said arms of said body; and wherein each of said steps has an inclined face facing inwardly of said arms to facilitate and guide insertion and placement of said root system on said body, and to facilitate removal of said plant from said body.

2. A root separator structure as claimed in claim 1, wherein said steps have coplanar rounded top shoulders upon which roots of said system can grow to help hold said plant in upright stable position.

3. A root separator structure as claimed in claim 2, wherein said steps space said arms from said peripheral walls with outer ends of said shoulders in contact with said peripheral walls, to allow adequate room for root growth in said compartments.

4. A root separator structure as claimed in claim 3, wherein said steps are integrally joined to said peripheral walls of said container.

5. A root separator structure as defined in claim 1 wherein said body is detached from said container to enable said body to be removed from said container along with said plant to facilitate detachment of said body from said root system.

6. A root separator structure as defined in claim 4, wherein said body is formed with an integral bottom wall which is integrally joined to said peripheral wall of said container, said bottom wall being apertured to facilitate water drainage from said container and to enhance aeration of said root system on said body.

7. A root separator structure as defined in claim 3, wherein said radial arms are three in number and arranged in a Y-shaped array.

8. A root separator structure as claimed in claim 4, wherein said radial arms are four in number and arranged in a cross-shaped array.

9. A root separator structure as defined in claim 1, wherein said body has a height axially of said container which is between 5% and 30% of the axial height of the interior of the container, to allow maximum room for growth of said root system of said plant.

* * * * *